United States Patent
Krawczyk et al.

Patent Number: 6,108,783
Date of Patent: Aug. 22, 2000

[54] CHAMELEON HASHING AND SIGNATURES

[75] Inventors: Hugo Mario Krawczyk, Haifa, Israel; Tal D. Rabin, Riverdale, N.Y.

[73] Assignee: International Business Machines Corporation, Armonk, N.Y.

[21] Appl. No.: 09/021,880

[22] Filed: Feb. 11, 1998

[51] Int. Cl.[7] ............................... H04L 9/32; H04L 9/28; H04L 9/30
[52] U.S. Cl. ..................... 713/180; 713/170; 713/176; 380/28; 380/30
[58] Field of Search ................... 380/28, 30, 46; 713/170, 172, 176, 177, 179, 180, 181

[56] References Cited

U.S. PATENT DOCUMENTS

| | | | |
|---|---|---|---|
| 5,097,504 | 3/1992 | Camion et al. | 380/23 |
| 5,537,475 | 7/1996 | Micali | 380/30 |
| 5,625,695 | 4/1997 | M'Raihi et al. | 380/28 |
| 5,832,089 | 11/1998 | Kravitz et al. | 380/24 |

OTHER PUBLICATIONS

Schneier, B., "Applied Cryptography Second Edition: Protocols, Algorithms, and Source Code in C," John Wiley & Sons, Oct. 18, 1995, section 19.3, pp. 466–474.

Abdel–Azeem, E. et al., "Cryptographic Security Evaluation of MD4 Hash Function," Radio Science Conf., 1996. NRSC '96, Mar. 21, 1996, pp. 345–354.

Primary Examiner—Tod R. Swann
Assistant Examiner—Justin T. Darrow
Attorney, Agent, or Firm—Scully, Scott, Murphy & Presser; Louis P. Herzberg

[57] ABSTRACT

A method for providing a digital signature, "chameleon signatures", which provide the signer of a digital signature exclusive control to disclose the contents of the signed information to third parties. The signatures are closely related to "undeniable signatures", but allow for simpler and more efficient realizations. The method is essentially non-interactive requiring no communication between sender and receiver and do not involve the design and complexity of zero knowledge proofs on which traditional undeniable signatures are based. The method employs a combination of standard digital signing methods with a unique hash functions. These hash functions are characterized by the non-standard property of being collision resistant for the signer but collision tractable for the recipient.

15 Claims, 5 Drawing Sheets

CHAMELEON HASHING AND SIGNATURES

BACKGROUND OF THE INVENTION

1. Technical Field

The present invention relates generally to securing communications using cryptography. More particularly, the present invention provides a method for enhancing the security of communications using chameleon signatures and is especially useful in preventing the receiver of a signed document from disclosing its contents to third parties.

2. Discussion of the Prior Art

Typical business relationships between companies or individuals involve commitments assumed by the parties in the form of agreements and contracts. Increasingly paper documents are being usurped by electronic information exchange with the transaction never taking paper form. An associated risk of electronic information exchange, however, is that the digital data may be much more easily duplicated and/or modified without limit and with insignificant cost. To exclude digital forgeries and impersonators, signer authentication and document authentication safeguards are utilized by the information security profession. Digital signature protocols represent the main cryptographic tool employed to provide document and signer authentication, integrity, and the nonrepudiation property. Authentication makes it possible for the receiver of a message to ascertain its origin. Integrity allows the receiver of a message to verify that it has not been modified in transit or while in storage. Nonrepudiation prevents a sender from falsely denying later that he sent a message.

Digital signature protocols achieve these results through key-based algorithms. All the security in these algorithms is based in the key (or keys); none is based in the details of the algorithm. This means that the algorithm may be freely published and analyzed. There are two general types of key based algorithms well known in the art: symmetric and public-key. In most symmetric algorithms the encryption key and the decryption key are the same. Digital signatures are derived through the use of "Public key algorithms". Public key algorithms, also called asymmetric algorithms, are designed so that the key used for signing is different from the key used for verification. The algorithms are called "public-key" because the verification key can be made public. In contrast, the signature key needs to be kept secret by its owner, the signer. Furthermore, the signing key cannot, in any reasonable amount of time, be calculated from the verification key. In practical implementations, public-key algorithms are often too inefficient to digitally sign long documents. To save time, digital signature protocols ( i.e., RSA, DSA) are often implemented with secure (one-way) hash functions. Instead of signing a document, the signer signs the hash of the document. A hash function is a function that maps a variable-length input string (i.e. document) and converts it to a fixed-length output string, usually smaller, called a hash-value. The hash-value serves as a compact representative image of the input string. Due to their functionality hash functions exhibit collision behaviour, i.e. they represent a many-to-one mapping. In order to preserve the non-repudiation and unforgeability properties of digital signatures when used in conjunction with a hash function, the hash function needs to be collision resistant. That is, it is computationally infeasible to find two messages which the hash maps to the same value.

Using digital signatures involves two processes, one performed by the signer, which is the generation of the signature, and the other by the receiver of the digital signature, which is the verification of the signature. The signer creates a digital signature by using his private signing key, and applying it through some computation to the hash result derived from the message. The second part of the process involves digital signature verification. Verification is the process of checking the digital signature by reference to the original message m and a given public verification key.

By the properties of cryptographic digital signatures there is no way to extract someone's digital signature from one document and attach it to another, nor is it possible to alter a signed message in any way without the change being detected. The slightest change in the signed document will cause the digital signature verification process to fail. However, digital signatures also allow any party to disclose, and prove, the signer's commitment to an outsider. This may be undesirable in many business situations. For example, disclosing a signed contract to a journalist or a competitor can benefit one party but jeopardize the interests of the other; early dissemination of confidential agreements can be used to achieve illegitimate earnings in the stock market; a losing bidder may want to prevent disclosure of his bid even after an auction is over. These and many other examples show how privacy, confidentiality and legal issues pose the need to prevent the arbitrary dissemination of the contents of some agreements and contracts by third parties or even by the recipient of a signature. Still in all these cases it is essential to preserve the non-repudiation property in the event of legal disputes. In such a case, an authorized arbitrator (i.e., judge, mediator) should be able to determine the validity of a contract, an agreement or commitment. In an attempt to bridge between the contradictory requirements of non-repudiation and controlled dissemination presented above, Chaum and van Antwerpen, "Undeniable signatures" In G. Brassard, editor, "Advances in Cryptology"—Crypto '89, pages 212–217, Berlin, 1989. Springer-Verlag. Lecture Notes in Computer Science No. 435, introduced undeniable signatures, which were subsequently the subject of many research works. A precursor of this type of signatures was already suggested in 1976 by Michael Rabin, "Digitalized Signatures", In R. Demillo and et. al, editors, Foundations of Secure Computations, pages 155–165, Academic Press, 1978, based on one-time signatures. The basic paradigm behind undeniable signatures is that verification of a signature requires the collaboration of the signer, so that the latter can control to whom the signed document is being disclosed. A crucial requirement for undeniable signatures is that the signature string will be non-transferable, i.e., will not convey any information on the contents of the signed document to anyone except for those parties that engage in some specified protocol directly with the signer. Such a protocol enables the signer to confirm a valid signature or deny an invalid one. To prevent leaking of information these protocols are based on zero-knowledge proofs. As it is natural to expect, the added properties and techniques relative to regular digital signatures also add to the complexity of the schemes, both conceptually and in computational and communication costs. Therefore it would be highly desirable to provide a method which bridges between the conflicting requirements of non-repudiation and controlled disclosure at a significantly lower cost and complexity while departing from the zero-knowledge paradigm of undeniable signatures which require a communication protocol between a sender and a receiver.

SUMMARY OF THE INVENTION

Accordingly, it is an object of the present invention to provide a method for building a signature scheme such that a signature provided by a signer S to a recipient R will have the properties of 1) assuring non-repudiable commitment of the signer S to the contents of the signed document, as regular digital signatures do, and 2) enabling the recipient R to verify the validity of the signature, and 3) non-transferability, i.e., not allowing any party including the recipient of the signature to disclose the contents of the signed information to any third party without the signer's consent.

Another object of the present invention is to provide a non-interactive signature scheme which departs from the interactive zero-knowledge based paradigm of undeniable signatures which require a communication protocol between a signer and a receiver.

It is a further object of the present invention to provide a simplified signature scheme which provides better computational performance than known undeniable signature schemes. And in fact to provide a signature scheme which is comparable in computation to standard signature schemes.

Yet another object of this invention is to provide a method for non-transferable non-repudiable signatures that uses digital signature algorithms (such as RSA and DSS) that are widely analyzed and standardized by international organizations.

This new signature scheme is herein referred to as Chameleon Signatures. Chameleon signatures are generated by first hashing a message with a special type of one-way hash functions, called Chameleon (Trapdoor) Hash functions, and then applying to the resultant hash value a conventional digital signature protocol. Chameleon hash functions are to a large extent similar to conventional secure (one-way) hash functions in that it is computationally infeasible to find collisions in the function, that is, to find two different messages that are mapped to the same hash value. However, chameleon hash functions differ from other conventional one-way hash methods in that there exists a secret, otherwise referred to as private or trapdoor, key associated with the chameleon hash function that makes it computationally feasible for the owner of the private key to find collisions; where finding a collision is defined as the ability to compute multiple messages which map to the same hash value. A chameleon signature issued to a certain recipient will use a chameleon hash function for which only said recipient knows the private key, in addition to a standard digital signature algorithm for which only the signer knows the private signing key.

The method of the present invention gives a signer S the exclusive ability to prove the authenticity of his digital signature. This is achieved through the properties of the chameleon hash function. The fact that the chameleon hash function is collision tractable for the recipient R, enables him to take a signature of the signer S for a message m, and convincingly claim that this is the signature for any other message m'. Hence, the recipient cannot be trusted to reveal the true contents of the signed document. Thus, unless the signer confirms the signature there is no method for effectively verifying its authenticity.

The combination of regular digital signature schemes and chameleon hashing results in simple and cost effective constructions of chameleon signatures. The security of chameleon signatures is proven based on standard cryptographic assumptions well known in the art. In particular, the unforgeability property is solely based on the unforgeability of the underlying digital signature in use (i.e., RSA, DSS). The non-repudiation property is based on the same assumptions needed to build chameleon hash functions, i.e., the hardness of factoring or computing discrete logarithms, and the non-transferability property also depends on the underlying chameleon hash function. While the method allows the underlying chameleon hash function to be based on standard cryptographic assumptions such as hardness of factoring or computing discrete logarithms, general constructions are also realizable and include those based on claw-free pairs of trapdoor permutations.

BRIEF DESCRIPTION OF THE DRAWINGS

Preferred embodiments of the present invention will now be described by way of example only, with reference to the accompanying drawings, in which.

DETAILED DESCRIPTION OF THE PREFERRED EMBODIMENTS OF THE INVENTION

The present invention is a method for generating digital signatures which provide an undeniable commitment of the signer to the contents of the signed document, as regular digital signatures do, but, at the same time, do not allow the recipient of the signature to disclose the contents of the signed information to any third party without the signer's consent. As will be described, the method involves the combination of regular digital signature schemes and a special hash function, hereinafter referred to as a chameleon hash function, or cham-hash(m,r), that is applied to a message to be sent over a communications channel. Prior to sending the message, the sender digitally "signs" the hash value of a message by applying a digital signature protocol. This digital signature is hereinafter referred to as a "chameleon signature", or cham-sig(m) that possesses the unique property of preventing the uncontrolled dissemination of the signed message by the recipient. That is to say that a signature from a sender S can only be validated or denied in collaboration with the signer. Only the receiver can be convinced of the validity of the contents of the signed message. Third parties are therefore precluded from being similarly convinced of the validity of a signature, even with the help of the receiver. Furthermore, chameleon signatures are recipient-specific, namely, if the same message is intended for two different recipients then the signer needs to sign it twice, once for each recipient.

Accordingly, the receiver receives the chameleon signature and verifies it using the chameleon hash function and the digital signature verification, as will be described. The recipient's knowledge of the private hash key, and his further knowledge that he did not disclose it to the signer ensures that the recipient can verify the sender's signature without the signer's cooperation, and furthermore, precludes the recipient from verifying that signature to third parties.

Prior to any communications between sender and receiver, the method requires the prerequisite generation of the public verification key and the private signing key by the sender. The keys are then utilized in the subsequent generation and communication of all chameleon signatures described in FIG. 3. The key pair is generated according to an agreed upon digital signature scheme (e.g. RSA, DSS) and is well known in the art.

In addition to the sender generating public and private verification keys as a pre-requisite to any communication between sender and receiver, the receiver must also generate, as a pre-requisite to any communication, public and private chameleon hash keys, HK and CK.

Figure 1:
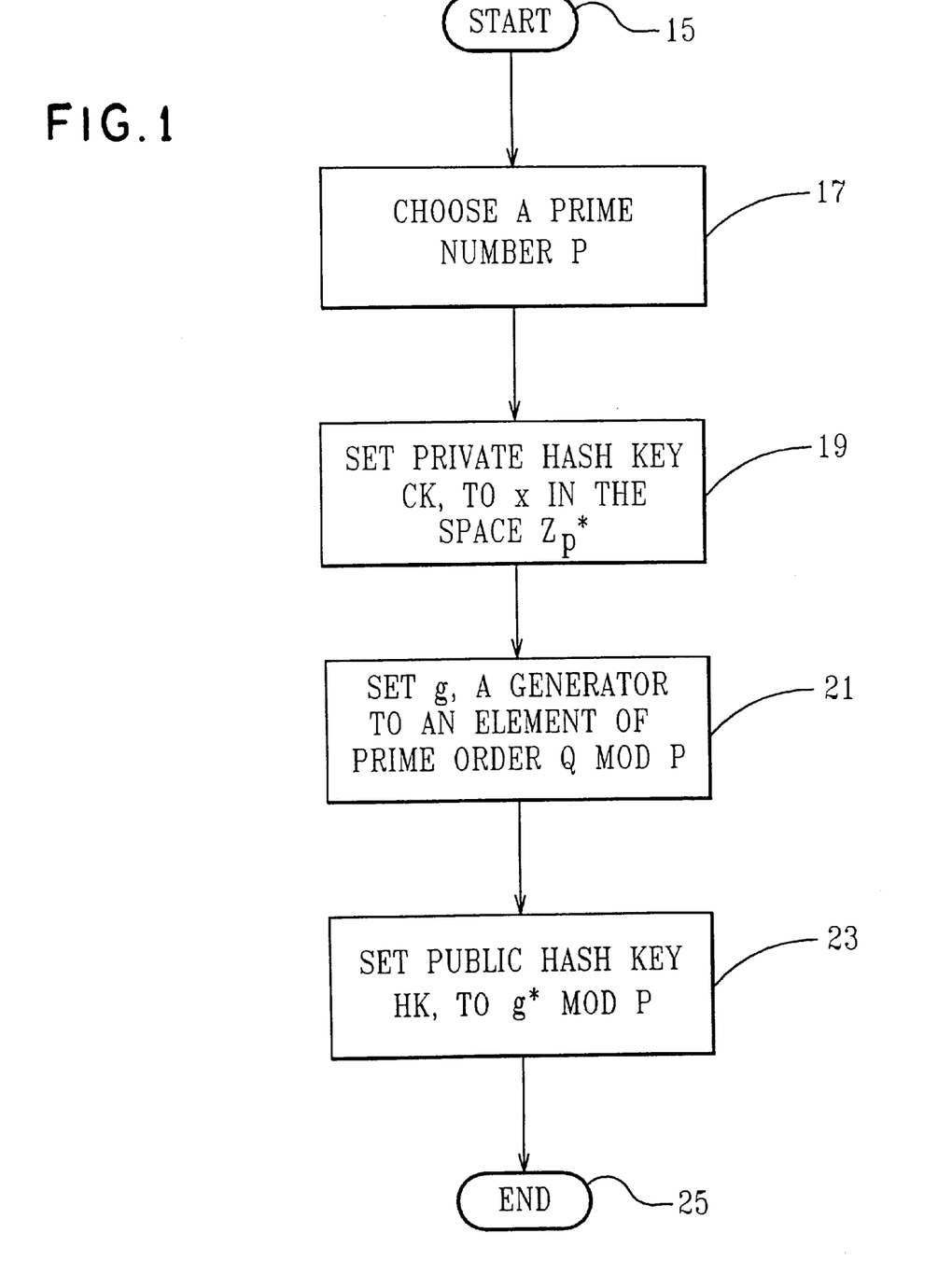
FIG. 1 illustrates the method steps to generate the Public and Private Chameleon Hash Keys, HK and CK respectively.

FIG. 1 describes the method steps in a first embodiment to generate the public and private chameleon hash keys, HK and CK. The chameleon keys are generated by the owner of the chameleon hash function. The owner is also the receiver in a preferred embodiment. The owner generates a pair of public and private hash keys HK and CK by first choosing a prime number p at step 17 and then chooses a generator g of order q in $Z^*_p$ at step 21. After these values have been chosen, the owner of the hash sets the private chameleon hash key CK to a random value x in $Z^*_p$ at step 19 and computes and sets the public chameleon hash key HK to $g^x$ mod p at step 23. This completes the generation of the private and public keys of the chameleon hash. The public hash key is HK with implicit values p and g.

In a second embodiment the generation of the public and private chameleon hash keys comprises choosing prime numbers p2 and q2, and setting private chameleon hash key to the the two values p2 and q2. The public chameleon hash key is obtained by computing the product of p2 and q2, N=p2*q2.

Figure 2:
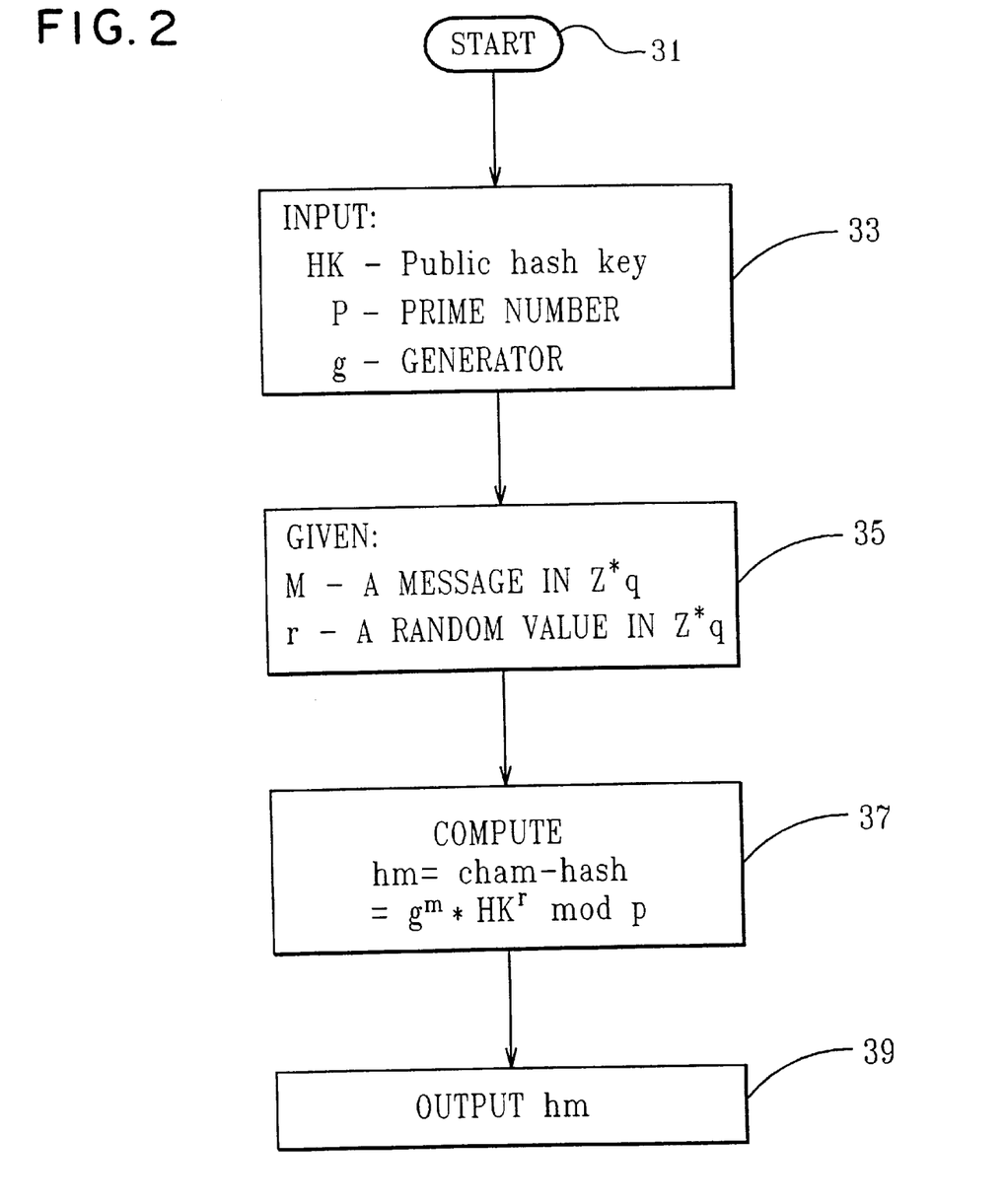
FIG. 2 illustrates the method steps to generate the Cham-hash function.

FIG. 2 illustrates the method steps required in the generation of the chameleon hash function for a first embodiment. Values for HK, the public hash key, p, a prime number, and g a generator of order q mod p, are input to this process, see step 33. At step 35, anyone who wishes to compute the chameleon hash receives as input a message m from the message set M. A random value r in $Z^*_q$ is also required as input. Note, if the value r is given as input there is no need to choose a random value, but rather use the given value.

The function cham-hash and the associated input arguments necessary to compute the chameleon hash-value of message m, hm, is described below and at step 37;

$$hm=\text{cham-hash}(m,r,HK)=g^m*HK^r \bmod p \quad \text{Eq.1}$$

In a second embodiment the generation of the chameleon hash function is based solely on the hardness of factoring which involves the calculation of the following pair of claw-free trapdoor permutations.

$$f_0(x)=x^2 \bmod n \quad \text{Eq. 2}$$

$$f_1(x)=4x^2 \bmod n \quad \text{Eq. 3}$$

where the domain of these functions should be taken as $$D=\{x \text{ in } Z^*_n|(x/p)=(x/q)=1\}. \quad \text{Eq. 4}$$

In this emobodiment a random value r is chosen to be between one and N, where N is the chameleon hash key. The random value r is then input into equation 5 to compute the chameleon hash $$\text{cham-hash}=4^m*(r^2)^{2|m|} \bmod n \quad \text{Eq. 5}$$

As briefly described, the chameleon hash of the present method has the following properties: 1) anyone that knows the public key can compute the associated hash function; 2) for those parties who don't know the private key (trapdoor) the function is collision resistant in the usual sense, namely, it is infeasible to find two inputs which are mapped to the same output; 3) The holder of the private key (trapdoor) can easily find collisions for every given input; and 4) from the output of the hash function no information can be feasibly learned as for the value or other properties of the signed message.

Figure 3:
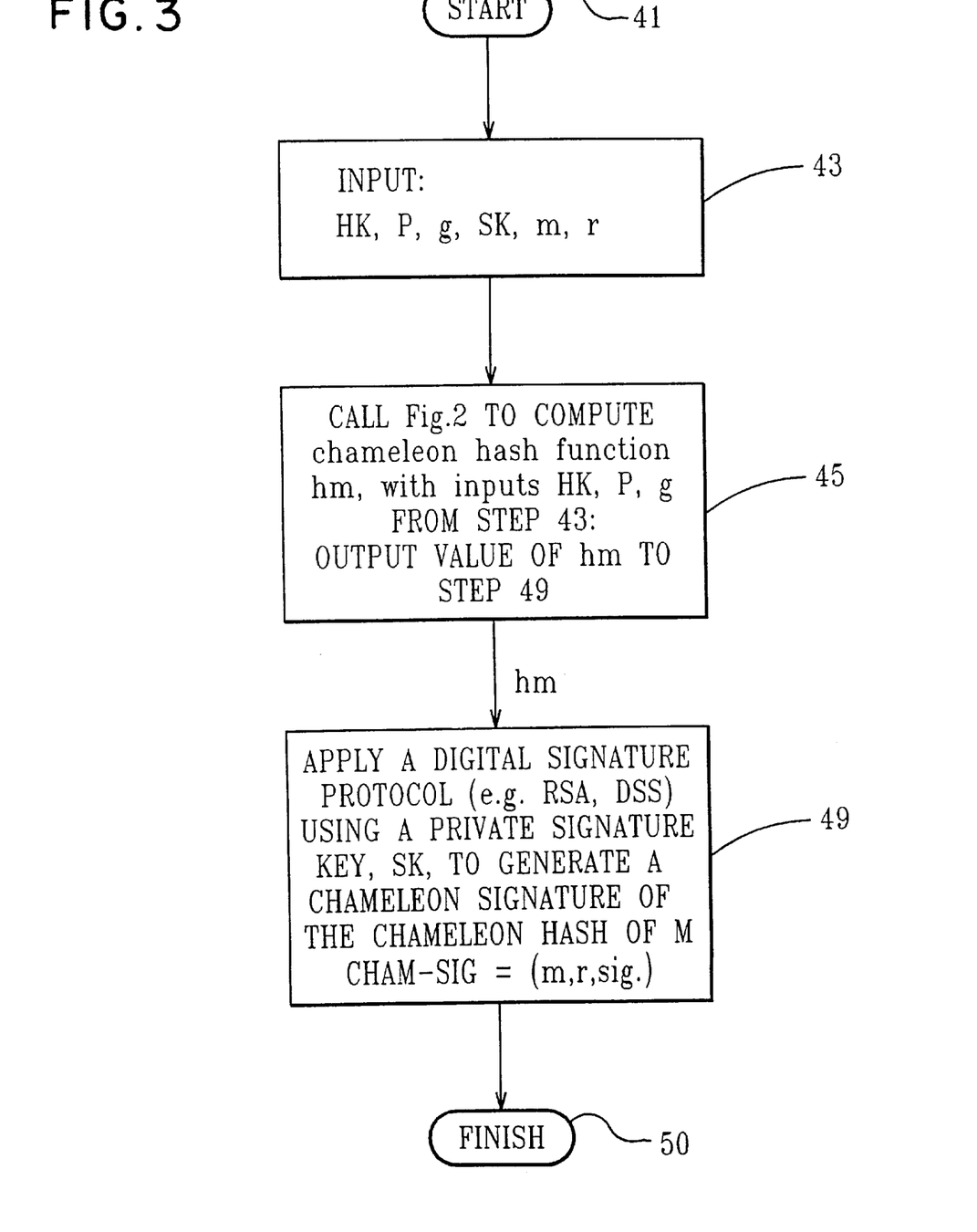
FIG. 3 illustrates the method steps for generating a chameleon signature.

Referring now to FIG. 3, describes the process steps in the generation of the chameleon signature. At step 43 values for HK, the private hash key, p, a prime number, g a generator, SK, the private signing key, m, the message and r, a random value are input. The sender computes the chameleon hash, hm, of the message at step 45, utilizing the protocol described in FIG. 2. The creation of the chameleon hash is described in detail in FIG. 2. At step 49, in accordance with the well-known hash-and-sign method, the sender will then "sign" the hash value hm by processing it in accordance with a standard digital signature protocol, e.g., RSA, DSS, to output the chameleon signature CHM-SIG=(m,r,sig).

Chamelon signatures employed in the scheme described possess the following beneficial properties:

Property 1: As in regular digital signatures, the signer S cannot repudiate (or deny) a signature he generated since he cannot find collisions in the hash;

Property 2: The recipient cannot prove to any third party that a given signature of S corresponds to a certain message since R could 'open' the signed message in any way he wants using the trapdoor key. In this sense the signature is like an appended message-independent signature (i.e., a hand-written signature) that can be 'cut-and-pasted' by R from one document to another; and, Property 3: Signatures are recipient-specific, namely, if the same message is intended for two different recipients then the signer needs to sign it twice, once for each recipient (since the chameleon hash functions are specific and different for each recipient).

Figure 4:
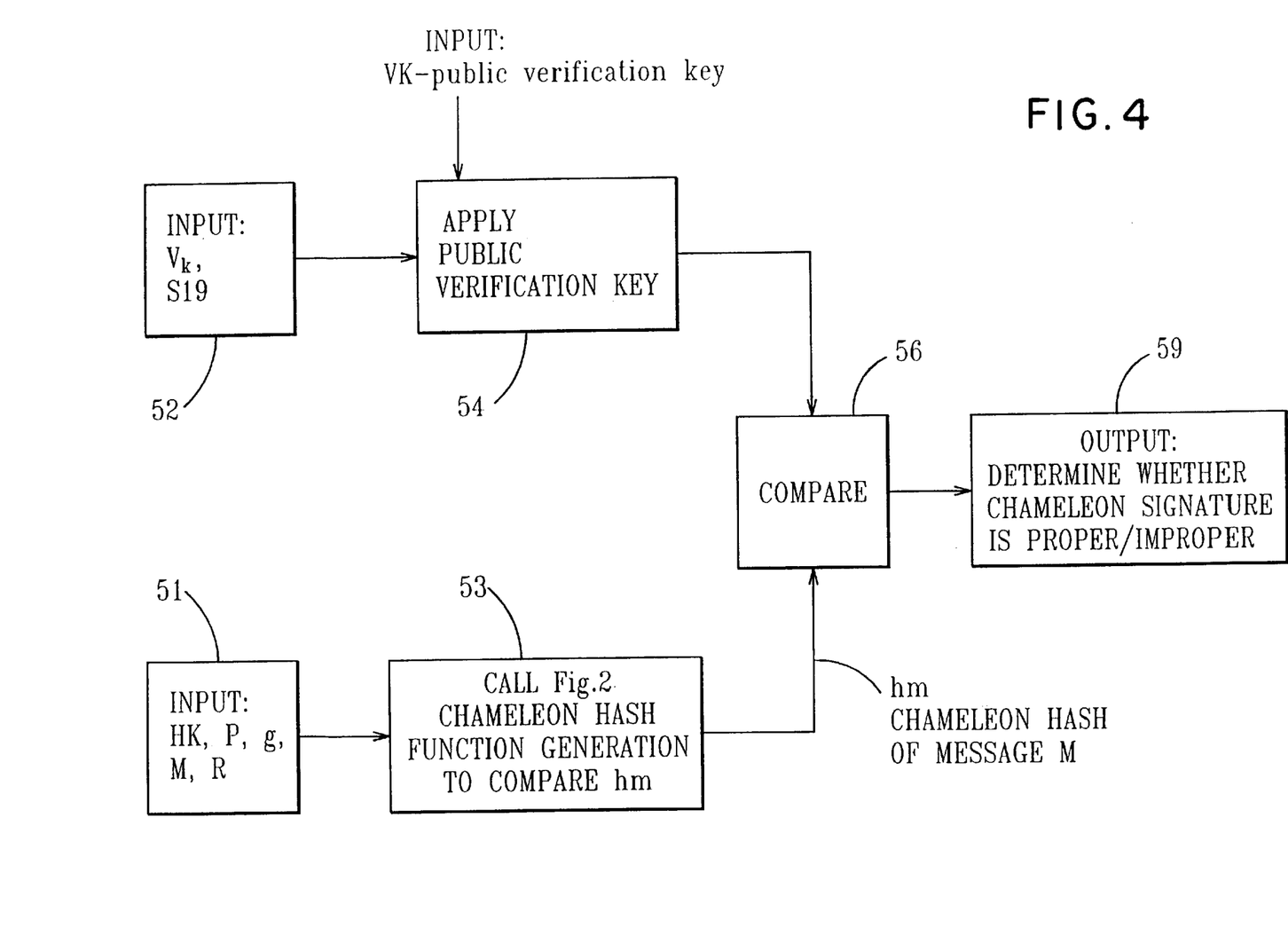
FIG. 4 illustrates the method steps for receiving and verifying a chameleon signature.

FIG. 4 illustrates the actions performed in order to verify the chameleon signature received from signer S. The process of verification requires as input the chameleon signature sig, the message m, and a random value r. These inputs are applied at steps 51 and 52. At step 54 the public verification key is applied to the chameleon signature, sig, with the output provided as one of two inputs at the compare step 56. At step 53 the chameleon hash function is applied to the input message m to create the chameleon hash of message m, hm, using the protocol described in FIG. 2, which is then output as the second input to the compare step at 56. At step 56 the two inputs are compared for equality to determine whether the chameleon signature is proper or improper. Note that the verification function is sufficent for the receiver R to get assurance of the validity of the sender's signature (i.e. R is assured that S will not be able to later deny the signature). However, for any other party, a successful verification represents no proof that S signed a particular message since the recipient R, knowing the private (trapdoor) hash key, CK could have produced it by himself. The knowledge of the trapdoor information enables computing trapdoor collisions. Computing trapdoor collisions is the same as the ability to generate an additional message $m_2$ from the message set M and $r_2$, given any pair $(m_1, r_1)$ which map to the same hash value.

The property of the signature being non-transferable for the recipient is because the hash is collision tractable upon knowledge of the private key, as described above, and is best illustrated by example. Given that receiver R possesses the following pieces of information (m,r,sig) which is the signature that S gave him, and CK, which is the private chameleon hash key associated with, and unique to, receiver R. The signature sig is a valid signature on the value hm, which is the chameleon hash of m and r, where m is the message and r is a random value. Thus, if R could show different values m',r' such that hm was the chameleon hash of these values as well then he could not be believed when he says that a specific m and r are the values which generated the hash value hm. Stated alternatively, if the receiver R, is capable of opening up the received signature as any message m' from a message set M containing one or more messages for transmission, then he cannot be trusted to indicate what the original message was. The receiver R's ability to exhibit such behaviour is due to the fact that the chameleon hash function is collision tractable to whomever knows the private (trapdoor) key. Thus, the receiver R's knowledge of the private chameleon hash key allows him to find multiple inputs from the set M which map to the same output, hm.

Figure 5:
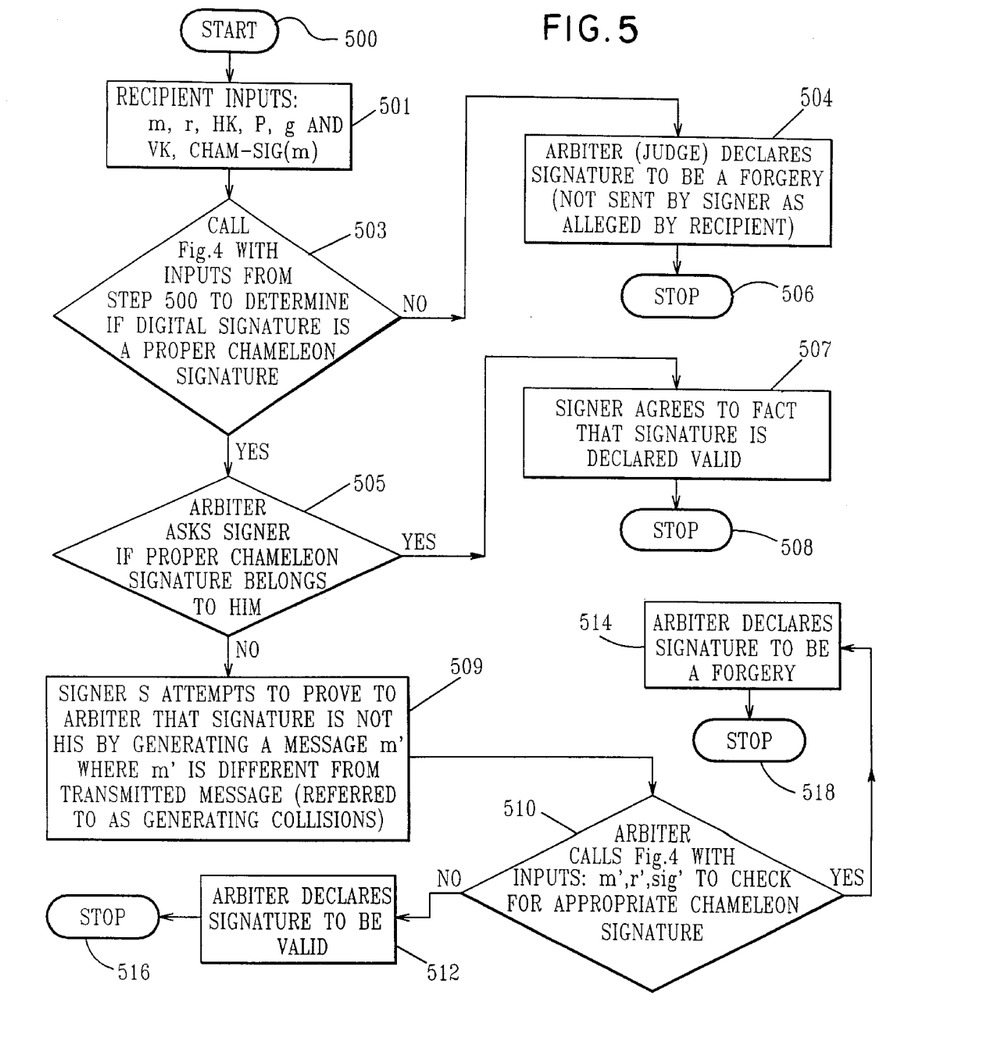
FIG. 5 illustrates how the present method may be utilized to resolve a potential dispute between a signer and a recipient of an alleged signature.

FIG. 5 illustrates, in a first embodiment, how the present method may be utilized to resolve a potential dispute between a signer and a recipient of an alleged signature. This procedure requires the participation of three parties; an arbiter (e.g. judge), the signer and the recipient.

Step 500 describes the initiation of the resolution process. At step 501 recipient R gives the arbiter the alleged chameleon signature $$\text{CHAM-SIG}(m')=(m', r', \text{sig}')$$

where m' represents the alleged message, r' represents a random number, and sig' represents the received signature. In addition to the aforementioned inputs, the receiver gives the arbiter the keys that the signature was generated under; prime number p generator g and public chameleon key HK, along with the signer's public verification key VK. At step 503 the arbiter initiates his check of the alleged signature by first verifying that it is a proper chameleon signature by employing the method defined in FIG. 4 for the inputs: m', r', sig', p, g, HK and VK. If it is not a proper chameleon signature then the arbiter decides that the alleged signature is a forgery at step 504 and the process terminates at step 506. If a branch to step 504 is not taken the arbiter still cannot declare the signature to be valid as the recipient R can generate values which are forgeries but pass the chameleon signature verification protocol, as described at step 18 of FIG. 4, i.e. are proper chameleon signatures.

At step 505 the arbiter turns to the signer to accept or reject the alleged chameleon signature. The signer checks whether the alleged signature is his. If it is the signer's signature, the signer tells this to the arbiter who declares that the signature is valid at step 507, thereby terminating the process at step 508. Otherwise, the signer proceeds to generate a proof that the alleged signature is a forgery at step 509.

Step 509 is the method step which describes how a signer proves that the signature is in fact a forgery. At step 509 the signer retrieves the original message m, and the randomness r, used to generate the signature sig' from his memory and proceeds to compute the trapdoor information by computing $x=(m-m')/(r'-r) \bmod q$. Then he chooses a random element $m^*$ in $Z^*_q$ and computes $r^*=(m+xr-m^*)/x \bmod q$, and gives the values $m^*$ and $r^*$ to the arbiter. Utilizing the protocol described in FIG. 4, the arbiter, at step 510, now checks to determine if $m^*, r^*$, sig' is a proper chameleon signature. If it is a proper signature, this means that the signer is successful in proving the signed message is not his, and a branch to step 514 occurs whereby the arbiter declares the signature to be a forgery and the process terminates at step Otherwise, if the signer is unsuccessful, then a branch to step 512 occurs whereby the arbiter declares the signature to be valid and the process terminates at step 516.

In a second embodiment, the generation of a collision to the chameleon hash function by the signer is found as follows;

| 1 | finding an index i such that m[i] is not equal to m'[i] |
| 2 | computing $r_1 = f_{m[i-1]}(f_{m[i-2]}( \ldots f_{m[k]}(r^2) \ldots ))$ |
| 3 | computing $r_2 = f_{m'[i-1]}(f_{m'[i-2]}( \ldots f_{m'[k]}(r^2) \ldots ))$ |
| 4 | computing $p2 = \gcd(r1 +/- 2r2, n)$ |
| 5 | computing $q2 = n/p2$ |
| 6 | choosing any message $m^*$ |
| 7 | computing $r^* = f^{-1}_{ma\,[1]}(f^{-1}_{ma\,[2]}( \ldots \text{cham-hash}(m,r) )) \ldots ))$ |
| 8 | outputting $m^*, r^*$ |

The second embodiment is referred to as claw-free trapdoor permutations, and represents a specific efficient implementation based on the hardness of factoring. The trapdoor information of these permutations is exploited to provide the trapdorr collision finding property of chameleon hashing. A pair of permutations $(f_0(x), f_1(x))$ over a common domain is called "claw-free" if it is computationally infeasible to find values x and y from a domain such that $f_0(x)=f_1(y)$. Table I. presents a construction of chameleon hashing based on such a pair provided that each permutation in the pair has an inverting trapdoor. It is further assumed that the message space on which the hash function is applied to be suffix-free (i.e. no message is represented as the suffix of another message). Such a message representation can be achieved by appending the length of the message to its end, or by using messages of the same length. The binary representation of a message m of length k is denoted as $m=m[1] \ldots m[k]$, where m[1] is the first message bit and m[k] the last.

| Setup to the function: |
| --- |
| A pair of claw-free trapdoor permutations $(f_0, f_0^{-1}, f_1, f_1^{-1})$. |
| Where the: |
| Private Key = $(f_0^{-1}, f_1^{-1})$, and the |
| Public Key = $(f_0, f_1)$ |
| The chameleon hash function is therefore: |
| Cham-hash$_{(f_0, f_1)}(m, r) = f_{m[k]} (f_{m[2]} (f_{m[1]}(r)) \ldots ))$ |

While the preferred embodiment indicated a single receiver, R, the present invention is enabling for multiple recipients where each recipient would generate a private chameleon hash key unique to that recipient. Multiple receivers would further require that S, sign the document for each recipient using the public chameleon hash key specific to that recipient.

Having thus described our invention, what we claim as new, and desire to secure by Letters Patent is:

1. A method for providing a non-repudiable commitment of a signer to the contents of a digitally signed document, containing a message m, to a recipient, said method comprising the steps of:

a) the recipient generating public and private chameleon hash keys and a chameleon hash function;

b) the signer generating a public verification key and a private signature key;

c) the signer utilizing said chameleon hash function and said public chameleon hash key to compute a chameleon hash value of said message m;

d) the signer applying said private signature key to said chameleon hash value to generate a chameleon signature of said message m;

e) transmitting said chameleon signature and said message m to said recipient;

f) verifying said chameleon signature for a message m using said chameleon hash function, said public chameleon hash key and said public verification key.

2. A method according to claim 1, wherein utilizing a chameleon hash function to compute a chameleon hash value of said message m, further comprises first utilizing a one-way hash function to compute a one-way hash value h of the message m, and inputting said one-way hash value h as input to the computation of said chameleon hash function to compute the chameleon hash value of said message m.

3. A method according to claim 1, wherein said chameleon hash function is collision tractable, thus precluding any party the ability to disclose the contents of said document without the signer's consent.

4. A method according to claim 1, further comprising validating said digitally signed document by said signer when said signer consents to the authorship of said document.

5. A method according to claim 1, further comprising the signer denying forgeries.

6. A method according to claim 1, wherein generating a chameleon signature of a message m further comprises the steps of:

generating said chameleon hash value of message m; and signing the hash value with said signer's private signature key using a digital signing function.

7. A method according to claim 6, wherein said signing function can be any symmetric or asymmetric algorithm.

8. A method according to claim 1, wherein verifying said chameleon signature for a message m further comprises:

receiving as input said chameleon signature on said message m, said public hash key; and said public verification key;

computing the chameleon hash on message m; and applying the public verification key to verity that said chameleon signature is a valid signature on the chameleon hash of message m.

9. A method according to claim 5, wherein denying forgeries of said digitally signed document further comprises generating a collision to the chameleon hash function of said recipient by the signer.

10. A method according to claim 9, wherein generating said public and private chameleon hash keys further comprises the steps of:

choosing a prime numbers p1 and q1;

choosing a generator g of order q1 mod p1;

setting said private chameleon hash key to a random value x between 1 and p1−1;

setting said public chameleon hash key to $g^x$ mod p1.

11. A method according to claim 10, wherein utilizing a chameleon hash function to compute a chameleon hash value of said message m; further comprises the steps of:

choosing a first random value r;

inputting said public chameleon hash key and said message m; and computing the chameleon hash of said message m as $$\text{cham-hash} = g^m * g^{xr} \mod p1.$$

12. A method according to claim 9, wherein generating a collision to the chameleon hash function by the signer further comprises:

receiving as input a forgery of said document m', a second random number r', said message m, a first random number r;

utilizing prime numbers p1 and q1 previously created by the recipient;

computing x=(m−m')/(r−r') mod q1;

choosing any message m* between 1 and p1−1;

computing r*=(m+xr+m*)/x mod q1; and outputting m*, r*.

13. A method according to claim 1, wherein generating public and private chameleon hash keys further comprises the steps of:

choosing prime numbers p2 and q2;

setting said private chameleon hash key to the pair of said values p2 and q2; and setting said public chameleon hash key to n where n is the product of p2 and q2.

14. A method according to claim 13, wherein utilizing a chameleon hash function to compute a chameleon hash value of said message m; further comprises the steps of:

choosing a first random value r between 1 and n, where n is said chameleon hash key; and computing a chameleon hash of message m as $$\text{cham-hash} = 4^m * (r^2)^{2^{|m|}} \mod n,$$

where |m| denotes the length in bits of the message m.

15. A method according to claim 14, wherein generating a collision to the chameleon hash function by the signer further comprises:

receiving as input a forgery of said document m', a second random number r', said message m, a first random number r;

utilizing said prime numbers p2 and q2 previously created by the recipient;

finding an index i such that m is not equal to m';

computing $f_0(z) = z^2$ mod n;

computing $f_1(z) = 4z^2$ mod n, where z is a variable;

computing $r_1 = f_{m[i-1]}(f_{m[i-2]}( \ldots f_{m[k]}(r^2) \ldots ))$;

computing $r_2 = f_{m'[i-1]}(f_{m'[i-2]}( \ldots f_{m'[k]}(r^2) \ldots ))$;

computing p2=gcd(r1±2r2,n);

computing q2=n/p2;

choosing any message m*;

computing $r* = f^{-1}_{m*[1]} (f^{-1}_{m*[2]} ( \ldots \text{cham-hash}(m,r))) \ldots ))$; and outputting m*, r*.

* * * * *